United States Patent
Takaku et al.

(10) Patent No.: US 8,948,947 B2
(45) Date of Patent: Feb. 3, 2015

(54) MOVING BODY

(71) Applicant: Honda Motor Co., Ltd., Minato-ku, Tokyo (JP)

(72) Inventors: Koichi Takaku, Wako (JP); Chihiro Wake, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/845,967

(22) Filed: Mar. 18, 2013

(65) Prior Publication Data
US 2014/0277880 A1    Sep. 18, 2014

(51) Int. Cl.
*B60L 11/18* (2006.01)
*H01M 8/04* (2006.01)

(52) U.S. Cl.
CPC ....... *B60L 11/1885* (2013.01); *H01M 8/04201* (2013.01); *Y10S 903/944* (2013.01)
USPC ............................................ 701/22; 903/944

(58) Field of Classification Search
USPC .......................................................... 701/22
See application file for complete search history.

(56) References Cited

U.S. PATENT DOCUMENTS

| | | | |
|---|---|---|---|
| 7,344,687 B2 * | 3/2008 | Oi et al. | 422/198 |
| 8,224,515 B2 * | 7/2012 | Saito | 701/22 |
| 8,652,699 B2 * | 2/2014 | Suematsu et al. | 429/444 |
| 2009/0064764 A1 * | 3/2009 | Kizaki et al. | 73/40.5 R |
| 2010/0203411 A1 * | 8/2010 | Hasuka | 429/442 |
| 2011/0252962 A1 * | 10/2011 | Von Helmolt et al. | 95/15 |
| 2011/0286913 A1 * | 11/2011 | Lugtigheid | 423/658.2 |
| 2013/0037165 A1 * | 2/2013 | Okawachi et al. | 141/4 |

FOREIGN PATENT DOCUMENTS

JP    2010-144771 A    7/2010

* cited by examiner

*Primary Examiner* — Thomas Tarcza
*Assistant Examiner* — Alex C Dunn
(74) *Attorney, Agent, or Firm* — Squire Patton Boggs (US) LLP

(57) ABSTRACT

A fuel cell vehicle is provided that can perform communicative filling only in a case in which it is possible to perform communicative filling appropriately. The vehicle includes: a pressure sensor and temperature sensor; a communication system that transmits data signals generated based on the outputs of these sensors; a battery; a lidded box that protects a hydrogen feed port; a lid switch; and a communicative filling ECU that activates the communication system after the lid has been opened. The ECU determines, based on the state of an activation prohibited flag, whether being a state in which activation of the system is not permitted in response to an opened-state of the lid having been detected. The ECU does not activate the system in a case of the flag being ON, and activates the system in a case of the flag being OFF.

21 Claims, 4 Drawing Sheets

MOVING BODY

This application is based on and claims the benefit of priority from Japanese Patent Application No. 2012-062858, filed on 19 Mar. 2012, the content of which is incorporated herein by reference.

BACKGROUND OF THE INVENTION

1. Field of the Invention

The present invention relates to a moving body. In more detail, the present invention relates to a moving body including a device that stores an energy source such as a storage vessel or electricity storage device, and fills fuel gas from an external supply device into the storage device or supplies electric power to the electricity storage device.

2. Related Art

Fuel cell vehicles travel by supplying air and hydrogen to the fuel cell, and driving an electric motor using the electric power thereby generated. In recent years, progress has been made in the practical implementation of fuel cell vehicles employing such fuel cells as the energy source for generating motive power. Although hydrogen is required to generate electric power with fuel cells, with the fuel cell vehicles of recent years, vehicles have become mainstream that store a sufficient amount of hydrogen in advance in a high-pressure tank or a hydrogen tank equipped with a storage alloy, and use the hydrogen inside of the tank to travel. In concert with this, vigorous research has progressed also in technology for filling hydrogen into the tank.

For example, with the fuel filling system of Patent Document 1, upon connecting the fuel filling device of the station with the vehicle and filling fuel gas into the tank of the vehicle, data signals related to the temperature and pressure of the tank are transmitted from the vehicle side to the station side, and the flowrate of fuel gas is adjusted based on the data signals received on the station side. Hereinafter, the filling of fuel gas while performing communication between the vehicle side and station side will be referred to as communicative filling.

Patent Document 1: Japanese Unexamined Patent Application, Publication No. 2010-144771

SUMMARY OF THE INVENTION

However, in order to configure so as to enable the supplying of fuel gas from the station at an appropriate flowrate according to the state of the tank of the vehicle in a case of performing such communicative filling, the data signals transmitted from the vehicle side to the station side require high reliability in which the current state of the tank is accurately reflected.

The present invention has an object of providing a moving body that can perform communicative filling only in a case it is possible to perform communicative filling appropriately.

In order to achieve the above-mentioned object, the present invention according to a first aspect provides a moving body (e.g., the fuel cell vehicle 2 described later) that includes: a storage vessel (e.g., the high-pressure tank 32 described later) that stores fuel gas; a pressure detection means (e.g., the pressure sensor 36 described later) for detecting a pressure inside of the storage vessel; a temperature detection means (e.g., the temperature sensor 37 described later) for detecting a temperature of the storage vessel; a transmitting means (e.g., the communication system 5, and the communicative filling ECU 51 and infrared transmitter 56, etc. thereof described later) for transmitting a data signal generated based on the pressure and the temperature thus detected to an external fuel gas supply device; a communication electric power supply device (e.g., the battery 52 described later) that supplies electric power to the transmitting means; a lidded box (e.g., the lidded box 21 described later) that protects inside thereof a gas feed port (e.g., the hydrogen feed port 22 described later) for filling fuel gas into the storage vessel; a lid opened-state detection means (e.g., the lid switch 57 described later) for detecting an opened state of a lid (e.g., the lid 23 described later) of the lidded box; and a control device (e.g., the communicative filling ECU 51 described later) that activates the transmitting means after the lid has been opened, and performs communication between the transmitting means and the fuel gas supply device. The control device is characterized by including an activation determination means (e.g., the communicative filling ECU 51, and means related to execution of S2, S4 and S5 in FIG. 2 described later) for determining whether being a state in which activation of the transmitting means is not permitted, in response to an opened-state of the lid having been detected. The control device does not activate the transmitting means in a case of the activation determination means having determined being a state in which activation in not permitted, and activates the transmitting means in a case of the activation determination means having determined being a state in which activation is permitted.

According to the first aspect of the present invention, upon trying to fill fuel gas from an external fuel gas supply device to the storage vessel of the moving body, when the lid is opened by the user, the lid opened-state detection means detects this, and on this event, it is determined whether being a state in which activation of the transmitting means in order to perform communicative filling is not permitted, and in the case of having determined that activation of the transmitting means is permitted, communicative filling is started. With the present invention, by determining whether being a state in which activation of the transmitting means is not permitted in the case of the lid having been opened in this way, it is possible to perform communicative filling only in a case in which the reliability of a data signal transmitted from the transmitting means is adequately guaranteed.

According to a second aspect of the present invention, it is preferable for the control device to further include a flag setting means (e.g., the communicative filling ECU 51, and means related to the execution of S10 in FIG. 2 and the processing of FIGS. 3 to 5 described later) for setting from OFF to ON an activation prohibited flag (e.g., the sensor failure flag, battery voltage decline flag and time-out flag described later) indicating being a state in which activation of the transmitting means is not permitted, in response to a predetermined prohibited condition being established, and the activation determination means to determine being a state in which activation of the transmitting means is not permitted in a case of the activation prohibited flag being ON, and to determine being a state in which activation of the transmitting means is permitted in a case of the activation prohibited flag being OFF.

In the second aspect of the present invention, by indirectly determining whether being a state in which activation of the transmitting means is permitted every time in a case of the lid having been opened, based on the state of the flag at this time, without directly determining using various sensors, it is possible to instantly determine the feasibility of activation of the transmitting means after the lid has been opened.

According to a third aspect of the present invention, it is preferable for the control device to further include a timing means for measuring an elapsed time since the opened-state of the lid was detected, and the prohibited condition to include the time measured by the timing means having exceeded a predetermined time.

In the third aspect of the present invention, the transmitting means is activated and communicative filling is performed in response to the lid having been opened. Therefore, in a case of the lid having forgotten to be closed after activating the transmitting means by the user opening the lid, the transmitting means will remain active while the lid is opened; therefore, it is considered that the remaining amount of the communication electric power supply device will decrease proportionally to the time for which the lid is opened. For this reason, the remaining amount of the communication electric power supply device may not be sufficient during the next filling, and a highly reliable data signal may not be able to be transmitted, even if the transmitting means is activated. Therefore, with the present invention, in a case of the elapsed time since the lid was opened exceeding a predetermined time, it is assumed that the lid has been forgotten to be closed, and the activation prohibited flag is turned ON in order to prohibit subsequent activation of the transmitting means. It is thereby possible to perform communicative filling only in a case in which the reliability of data signals transmitted from the transmitting means is adequately guaranteed. In addition, it is possible to prevent an excessive decline in the remaining amount of the communication electric power supply device, even in a case of filling fuel gas over a prolonged time from an electrolyzer or the like.

According to a fourth aspect of the present invention, it is preferable for the control device to further include a remaining amount detection means (e.g., the communicative filling ECU 51, and means related to the execution of S31 in FIG. 4 described later) for detecting a remaining amount of the communication electric power supply device, and the prohibited condition to include the remaining amount detected by the remaining amount detection means having become no more than a predetermined value.

According to the fourth aspect, if the remaining amount of the communication electric power supply device becomes small as described above, a highly reliable data signal may not be able to be transmitted, even if the transmitting means is activated. Therefore, with the present invention, the activation prohibited flag is turned ON in order to prohibit a next activation of the transmitting means, in a case of the remaining amount of the electric power supply means having become no more than a predetermined value, whereby it is possible to perform communicative filling only in a case in which the reliability of data signals transmitted from the transmitting means is adequately guaranteed.

According to a fifth aspect of the present invention, it is preferable for the moving body to further include a lid closed-state detection means (e.g., the lid switch 57 described later) for detecting a closed-state of the lid, and the flag setting means to set the activation prohibited flag from ON to OFF in a case of the lid closed-state detection means having detected the closed-state of the lid, while the activation prohibited flag is ON.

According to the fifth aspect of the present invention, since the lid has been appropriately closed by the user in a case of the closed state of the lid being detected, it is assumed that there is no excessive decline in the remaining amount of the communication electric power supply device during the next activation of the transmitting means, and the activation prohibited flag is turned OFF. It is thereby possible to prevent activation of the transmitting means from being excessively prohibited.

According to a sixth aspect of the present invention, it is preferable for the moving body to be a fuel cell vehicle (e.g., the fuel cell vehicle 2 described later) that includes a fuel cell system (e.g., the fuel cell system 3 described later) that generates electricity using fuel gas inside of the storage vessel, and an activation request detection means (e.g., the ignition switch 39 described later) for detecting an activation request for the fuel cell system, and the flag setting means to set the activation prohibited flag from ON to OFF in a case of the activation request detection means having detected an activation request for the fuel cell system, while the activation prohibited flag is ON.

According to the sixth aspect, when the fuel cell system is activated, it is possible to supply the electric power thus generated to the communication electric power supply device. Therefore, with the present invention, it is assumed that there is no excessive decline in the remaining amount of the communication electric power supply device during the next activation of the transmitting means in a case of the fuel cell system having been activated, and thus the activation prohibited flag is turned OFF. It is thereby possible to prevent the activation of the transmitting means from being excessively prohibited.

According to a seventh aspect of the present invention, it is preferable for the control device to further include a first failure detection means (e.g., the communicative filling ECU 51, and means related to the execution of S42 in FIG. 5 described later) for detecting failure of the pressure detection means, and a second failure detection means (e.g., the communicative filling ECU 51, and means related to the execution of S41 in FIG. 5 described later) for detecting failure of the temperature detection means, and the prohibited condition to include at least one among the first failure detection means and the second failure detection means having detected failure.

According to the seventh aspect of the present invention, it is determined that the reliability of the data signal itself transmitted from the transmitting means is not adequate in a case of failure of at least one among the pressure detection means and the temperature detection means having been detected, and then the activation prohibited flag is turned ON. It is thereby possible to perform communicative filling only in a case in which the reliability of the data signals transmitted from the transmitting means is adequately guaranteed.

In order to achieve the above-mentioned object, the present invention according to an eighth aspect provides a moving body that includes: an electricity storage device that stores electric power; a state detection means for detecting a parameter correlated to a state of the electricity storage device; a transmitting means for transmitting a data signal generated based on the parameter thus detected to an external electric power supply device; a communication electric power supply device that supplies electric power to the transmitting means; a lidded box that protects inside thereof an electrical supply port for supplying electric power to the electricity storage device; a lid opened-state detection means for detecting an opened state of a lid of the lidded box; and a control device that activates the transmitting means after the lid has been opened, and performs communication between the transmitting means and the electric power supply device. The control device is characterized by including an activation determination means for determining whether being a state in which activation of the transmitting means is not permitted, in response to an opened-state of the lid having been detected, the control device does not activate the transmitting means in a case of the activation determination means having determined being a state in which activation in not permitted, and activates the transmitting means in a case of the activation determination means having determined being a state in which activation is permitted.

According to a ninth aspect of the present invention, it is preferable for the control device to further include a flag setting means for setting from OFF to ON an activation prohibited flag indicating being a state in which activation of the transmitting means is not permitted, in response to a predetermined prohibited condition being established, and the activation determination means to determine being a state in which activation of the transmitting means is not permitted in a case of the activation prohibited flag being ON, and determines being a state in which activation of the transmitting means is permitted in a case of the activation prohibited flag being OFF.

According to a tenth aspect of the present invention, it is preferable for the control device to further include: a timing means for measuring an elapsed time since the opened-state of the lid was detected; a remaining amount detection means for detecting a remaining amount of the communication electric power supply device; and a lid closed-state detection means for detecting a closed-state of the lid, and the prohibited condition to include the time measured by the timing means having exceeded a predetermined time, and the remaining amount detected by the remaining amount detection means having become no more than a predetermined value.

It is preferable for the flag setting means to set the activation prohibited flag from ON to OFF in a case of the lid closed-state detection means having detected the closed-state of the lid, while the activation prohibited flag is ON.

According to an eleventh aspect of the present invention, it is preferable for the moving body to be a hybrid vehicle that includes an internal combustion engine, a power generator that generates electricity using motive force generated by the internal combustion engine, and an activation request detection means for detecting an activation request for the internal combustion engine, and the flag setting means to set the activation prohibited flag from ON to OFF in a case of the activation request detection means having detected an activation request for the internal combustion engine while the activation prohibited flag is ON.

The same effects as the above first to seventh aspects are exerted by the eighth to eleventh aspects of the present invention.

DETAILED DESCRIPTION OF THE INVENTION

Hereinafter, an embodiment of the present invention will be explained while referencing the drawings.

Figure 1:
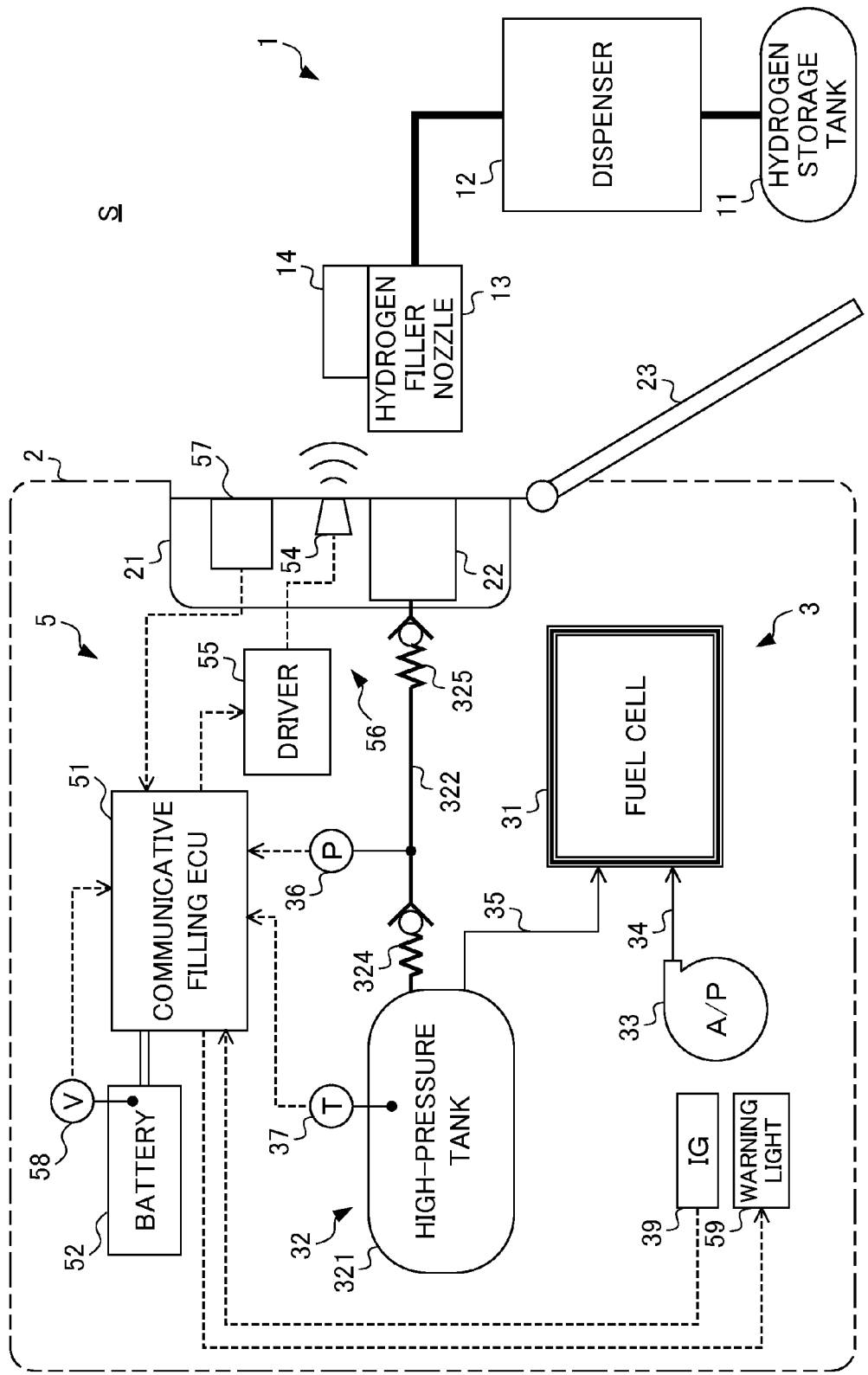
FIG. 1 is a view showing the configuration of a hydrogen filling system configured by a vehicle and a hydrogen gas station according to an embodiment of the present invention.

FIG. 1 is a view showing the configuration of a hydrogen filling system S configured by a vehicle 2 according to the present embodiment and a hydrogen gas station 1. The vehicle 2 is a moving body called a fuel cell vehicle, which includes a fuel cell system 3 that generates electricity using hydrogen stored in a high-pressure tank 32, and travels using the electric power generated by this fuel cell system 3. The hydrogen gas station 1 is established separately from the vehicle 2, and fills hydrogen required for the travel of the vehicle 2 into the high-pressure tank 32. Hereinafter, the configurations of the hydrogen gas station 1 and the fuel cell vehicle 2 will be explained in order.

Configuration of Hydrogen Gas Station

The hydrogen gas station 1 includes a hydrogen storage tank 11 and a dispenser 12.

Hydrogen to be supplied to the vehicle 2 is stored in the hydrogen storage tank 11 at high pressure. The hydrogen in this hydrogen storage tank 11 is gas arrived at by compressing with a compressor hydrogen produced by vaporizing liquid hydrogen, hydrogen produced by reforming a raw material by way of a reformer, hydrogen produced using an electrolyzer, or the like.

The dispenser 12 reduces the pressure of the hydrogen gas supplied from the hydrogen storage tank 11 when a hydrogen filler nozzle 13 thereof is inserted into a hydrogen feed port 22 provided to the vehicle 2, and upon adjusting to a preferred flowrate, supplies the hydrogen from the hydrogen filler nozzle 13. An infrared communication unit 14 is provided to this hydrogen filler nozzle 13. By inserting the hydrogen filler nozzle 13 into the hydrogen feed port 22, the infrared communication unit 14 becomes able to send and receive data signals via infrared waves with a communication system 5 described later that is equipped to the vehicle 2. Upon filling hydrogen into the vehicle 2 with the dispenser 12, it is possible to selectively execute the two filling methods of a filling method called communicative filling, and a filling method called non-communicative filling.

Communicative filling is a filling method of filling hydrogen into the vehicle 2 while performing communication between the vehicle 2 and the station 1. More specifically, the dispenser 12 receives data signals indicating the current state of the high-pressure tank 32 from the communication system 5 described later equipped to the vehicle 2 by way of the infrared communication unit 14, grasps the current state of the high-pressure tank 32 from this data signal, and fills hydrogen into the high-pressure tank 32 while adjusting the filling flowrate in accordance with the state.

Non-communicative filling is a filling method of filling hydrogen into the vehicle 2 without performing communication between the vehicle 2 and the station 1. More specifically, the dispenser 12 fills hydrogen into the high-pressure tank 32 at a fixed filling flowrate established in advance. The dispenser 12 assumes that the current state of the high-pressure tank 32 is high temperature during non-communicative filling; therefore, the filling flowrate is set to a relatively small value. However, different from communicative filling, in non-communicative filling, the dispenser 12 cannot grasp the current state of the high-pressure tank 32; therefore, even if the temperature inside of the tank rises during filling, the filling flowrate cannot be reduced in response thereto, and the filling continues at a fixed flowrate. For this reason, in non-communicative filling, the temperature inside of the high-pressure tank 32 during filling may approach a defined maximum temperature and filling may be interrupted prior to reaching complete filling. Therefore, if the temperature inside of the high-pressure tank 32 during filling not exceeding the defined maximum temperature is set as a condition, when comparing between communicative filling and non-communicative filling, communicative filling can more suitably control the filling flowrate; therefore, it can more quickly completely fill.

Configuration of Fuel Cell Vehicle

The vehicle 2 includes the fuel cell system 3 and the communication system 5.

The fuel cell system 3 includes a fuel cell 31, the high-pressure tank 32 that supplies hydrogen as fuel gas to this fuel cell 31, an air pump 33 that supplies air as oxidant gas to the fuel cell 31, and an ignition switch 39 that detects an activation request to the fuel cell system 3.

The fuel cell 31 is a stack structure in which several tens to several hundreds of cells are layered, for example. Each cell of the fuel cell is configured by sandwiching a membrane electrode assembly (MEA) with a pair of separators. The membrane electrode assembly is configured from the two electrodes of an anode and cathode, and a solid polymer electrolyte membrane that is sandwiched between these electrodes. Normally, both electrodes are formed from a catalyst layer that contacts the solid polymer electrode membrane and on which oxidation/reduction reaction occurs, and a gas diffusion layer that contacts this catalyst layer.

The air pump 33 is connected to a cathode channel formed in a cathode side of the fuel cell 31 via an air supply line 34. The high-pressure tank 32 is connected to an anode channel formed in an anode side of the fuel cell 31 via a hydrogen supply line 35. When the fuel cell system 3 is started on the event of operation of the ignition switch 39 by the user, hydrogen from the high-pressure tank 32 is supplied to the anode channel of the fuel cell 31, and air from the air pump 33 is supplied to the cathode channel, whereby electric power generation is performed. The electric power generated by the fuel cell 31 is supplied to a drive motor that is not illustrated, whereby the vehicle 2 travels.

The high-pressure tank 32 includes a tank main body 312 that stores hydrogen compressed to high pressure, and a hydrogen feed line 322. The hydrogen feed line 322 is connected at one end side to the tank main body 321, and the other end side is connected to the hydrogen feed port 22 provided inside of a lidded box 21 described later. In order to prevent hydrogen from back-flowing from the tank main body 321 side to outside of the vehicle 2, check valves 324 and 325 are provided in the hydrogen feed line 322 in the vicinity of the tank main body 321 and the vicinity of the hydrogen feed port 22, respectively.

In addition, a pressure sensor 36 and temperature sensor 37 are provided to the high-pressure tank 32 as sensors for detecting the state thereof. The pressure sensor 36 detects the hydrogen pressure in the high-pressure tank 32 inside of a hydrogen feed line 322, and transmits a detection signal substantially proportional to the detection value to the communication system 5. The temperature sensor 37 detects the hydrogen temperature in the high-pressure tank 32 inside of a tank main body 321, and transmits a detection signal substantially proportional to the detection value to the communication system 5.

The lidded box 21 is provided on a side at the rear of the vehicle 2, and protects inside thereof the hydrogen feed port 22. A lid 23 is provided rotatably to this lidded box 21. At the hydrogen gas station 1, the user opens the lid 23 to expose the hydrogen feed port 22 to outside, and then inserts the hydrogen filler nozzle 13 of the dispenser 12 into the hydrogen feed port 22 to fill hydrogen.

The communication system 5 includes a communicative filling ECU 51, battery 52, infrared transmitter 56, lid switch 57, and voltage sensor 58, and sensor failure warning light 59.

The battery 52 is used as the electric power supply source of electric devices constituting the communication system 5 such as the communicative filling ECU 51, infrared transmitter 56 and lid switch 57, mainly; however, in addition to the communication system 5, it is also used as an electric power supply source of auxiliary devices of the vehicle 2 that are not illustrated. This battery 52 is configured so as to be charged by the electric power generated by the fuel cell 31. The voltage sensor 58 detects the voltage of the battery 52, and sends a detection signal substantially proportional to a detection value to the communicative filling ECU 51.

The lid switch 57 is provided to the lidded box 21, and detects the opened/closed state of the lid 23. In a state in which the lid 23 is closed and the hydrogen feed port 22 is protected inside of the lidded box 21, the lid switch 24 sends a closed signal indicating this to the communicative filling ECU 51, and in a case in which the lid 23 is opened and the hydrogen feed port 22 is exposed to outside, sends an opened signal indicating this to the communicative filling ECU 51. It should be noted that either among this closed signal and opened signal may be set as a non-signal.

A sensor failure warning light 59 is provided to the instrument panel of the vehicle 2 as a display device for displaying the state of the pressure sensor 36 and temperature sensor 37. The sensor failure warning light 59 illuminates in response to having determined that either of the sensors 36 and 37 is failing during activation of the communication system 5, in the processing shown in FIG. 2 described later. A user can thereby recognize that either of the sensors 36 and 37 is failing, and being a state in which activation of the communication system 5 cannot be permitted due to these failures.

The infrared transmitter 56 is configured by an infrared LED 54 and a driver 55 thereof. The driver 55 switches on and off the infrared LED 54 based on a data signal sent from the communicative filling ECU 51.

The communicative filling ECU 51 is a control device that controls various devices constituting the communication system 5 for performing communicative filling, and is configured to include a CPU, ROM, RAM and electronic circuits such as various interfaces. The detection signals from the various sensors of the communication system 5 and fuel cell system 3, such as the lid switch 57, voltage sensor 58, pressure sensor 36, temperature sensor 37 and ignition switch 39, are inputted to the communicative filling ECU 51.

During the execution of communicative filling, since the communicative filling ECU 51 sends information related to the current state of the high-pressure tank 32 to the station 1 side, it generates a data signal based on the pressure and temperature detected by the pressure sensor 36 and temperature sensor 37, and sends this data signal to the driver 55. The driver 55 sends a data signal to the infrared communication unit 14 on the station 1 side by causing the infrared LED 54 to switch on and off in response thereto.

The communication system 5 configured in the above way activates/stops on the event of the opening/closing of the lid 23 by the user. Hereinafter, the activation sequence and stop sequence of the communication system 5 will be explained.

Activation of Communication System

When the lid 23 is opened by the user, the lid switch 57 detects this, and sends an opened signal indicating that the lid 23 has been opened to the communicative filling ECU 51, which is in a sleep state. In response thereto, the communicative filling ECU 51 determines whether the activation prohibited flag (time-out flag, battery voltage decline flag, sensor failure flag) is OFF according to the sequence explained in detail while referencing FIG. 2 later, returns from the sleep state only in the case of the activation prohibited flag being OFF, and starts the supply of electric power from the battery 52 to the infrared transmitter 56. Subsequently, a state is entered in which the transmission of data signals from the communication system 5 is possible, the hydrogen filler nozzle 13 on the station 1 side being inserted into the hydrogen feed port 22, and in response to the filling of hydrogen and having entered as state in which communication between the vehicle 2 and the station 1 is possible, communicative filling starts.

Stoppage of Communication System

When communicative filling ends appropriately, the hydrogen filler nozzle 13 is removed from the hydrogen feed port 22 by the user, and then the lid 23 is closed. When the lid 23 is closed, the lid switch 57 detects this, and sends a closed signal indicating that the lid 23 has been closed to the communicative filling ECU 51. In response thereto, the communicative filling ECU 51 stops the supply of electric power to the infrared transmitter 56, and enters the sleep state.

Next, while referencing FIGS. 2 to 5, a specific sequence of activation and stop of the communication system will be explained while referencing flowcharts.

Figure 2:
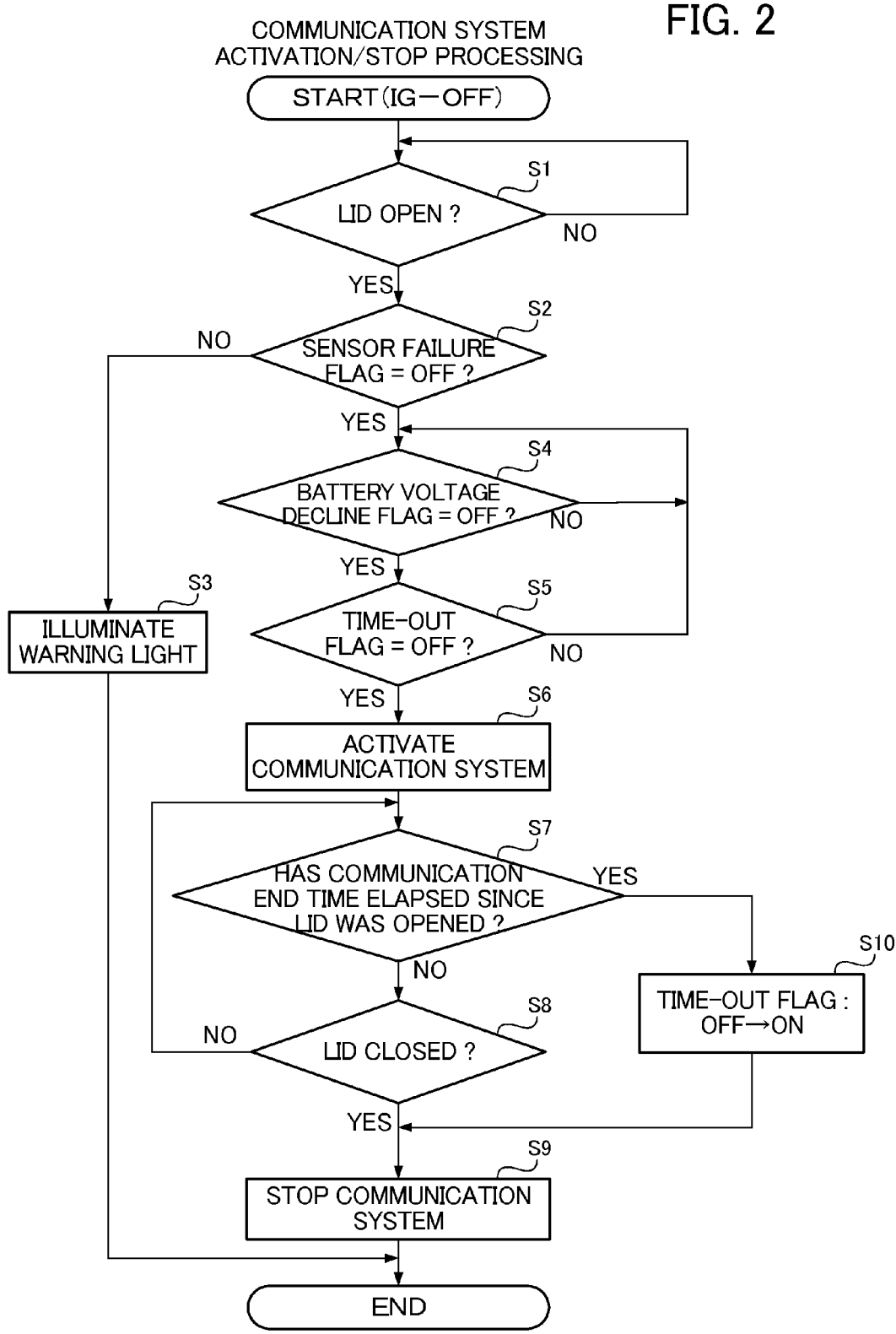
FIG. 2 is a flowchart showing the sequence of activation/stop processing of a communication system.

FIG. 2 is a flowchart showing the sequence from activation until stopping the communication system 5. This communication system activation/stop processing is executed in the communicative filling ECU when in a sleep state and the ignition switch is turned OFF.

In S1, it is determined whether the lid has been opened (whether a lid opened state has been detected by the lid sensor), and only in a case of the lid having been opened, the processing is advanced to the next step, S2.

In S2, it is determined whether the sensor failure flag is OFF. The sensor failure flag is a flag indicating being a state in which at least either of the pressure sensor and the temperature has failed, and is updated according to the sequence shown in FIG. 5 described later. In the case of this determination in S2 being NO, i.e. in a case of either of the temperature sensor or pressure sensor failing, the processing advances to S3, and after the warning light indicating that a sensor is failing and being in a state in which activation of the communication system is not permitted due to failure of a sensor, this processing is ended without activating the communication system. In the case of the determination in S2 being YES, the processing advances to S4.

In S4, it is determined whether the battery voltage decline flag is OFF. The battery voltage decline flag is a flag indicating being a state in which the remaining amount of the aforementioned battery is small, and is updated according to the sequence shown in FIG. 4 described later. In the case of the determination in S4 being YES, the processing advances to S5.

In S5, it is determined whether the time-out flag is OFF. The time-out flag is a flag indicating that the communication system has been forcibly stopped due to the lid having forgotten to be closed during previous activation of the communication system, and is updated according to S10 and the sequence shown in FIG. 3 described later.

In the case of the determination in S5 being YES, the processing is advanced to the next step, S6, in order to activate the communication system. In other words, only in a case of the determinations in the above S2, S4 and S5 all being YES, i.e. only in a case in which the sensor failure flag, battery voltage decline flag and time-out flag all are OFF, the processing advances to the next step, S6, in order to activate the communication system. In a case of any among the abovementioned three flags turning ON, the communication system will not be activated. In other words, these three flags respectively function as activation prohibiting flags indicating being in a state in which activation of the communication system is not permitted.

In a case of the sensor failure flag being ON, i.e. in a case of either of the pressure sensor or temperature sensor failing, activation of the communication system is prohibited since it may not be possible to transmit reliable data signals even if activating the communication system.

In a case of the battery voltage decline flag being ON, i.e. in a case of the remaining amount of the battery being small, the activation of the communication system is prohibited since electric power cannot be stably supplied to the communicative filling ECU and infrared transmitter, and it may not be possible to transmit reliable data signals.

In a case of the time-out flag being ON, i.e. in a case of having forgotten to close the lid upon previously activating the communication system, the remaining amount of the battery decreases due to the communication system having been left activated over a long time period, and thus the activation of the communication system is prohibited since electric power cannot be stably supplied to the communicative filling ECU and infrared transmitter, and it may not be possible to transmit reliable data signals.

In S6, the communication system is activated, and the processing advances to S7. More specifically, the communicative filling ECU is recovered from the sleep state and electric power is supplied from the battery to the infrared transmitter to establish a state in which infrared communication with the station side is possible. From thereon, communicative filling starts. It should be noted that the processing in the above S1 to S5 is all executed by the communicative filling ECU in the sleep state.

In S7, it is determined whether a predetermined communication end time has elapsed since detecting that the lid was opened in the above S1. In the case of this determination in S7 being NO, the processing advances to S8, and it is determined whether the lid has been closed. In the case of this determination in S8 being YES, it is determined that communicative filling ended appropriately and the lid has been closed by the user, the processing advances to S9, and the communication system is stepped. In other words, the supply of electric power from the battery to the transmitter driver is ended, and the communicative filling ECU is established in the sleep state.

On the other hand, in the case of the determination in S8 being NO, the processing advances to S7 again, and it is determined whether the communication end time has elapsed. In the case of this determination in S7 being YES, it is determined that the lid has been forgotten to be closed by the user, and after the time-out flag has been set from OFF to ON in order to protect against a dead battery (S10), the communication system is stopped (S9). Herein, if once the time-out flag turns ON, this time-out flag remains ON unless reset to OFF in the sequence explained while referencing FIG. 3 later.

Figure 3:
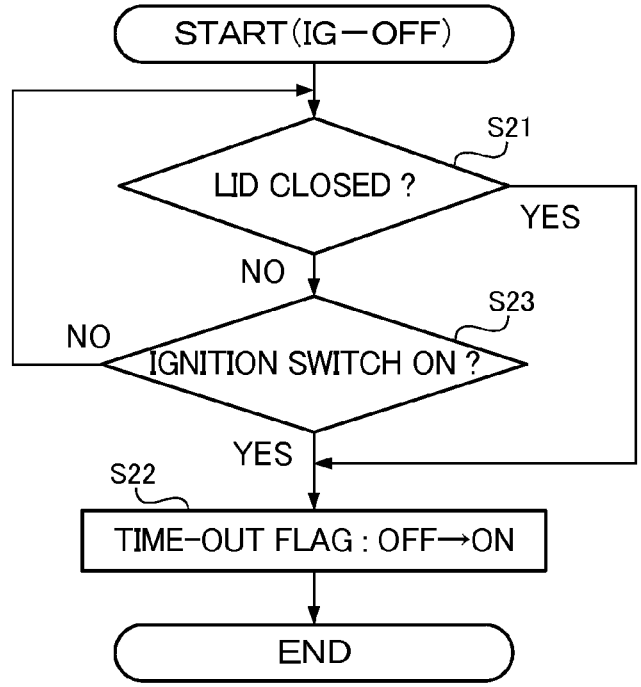
FIG. 3 is a flowchart showing the sequence of resetting a time-out flag.

FIG. 3 is a flowchart showing the sequence of resetting the time-out flag to OFF, executed in the communicative filling ECU having entered the sleep state, after the time-out flag is set to ON and the communication system is stopped in S10 of the above FIG. 2.

In S21, it is determined whether the lid has been closed. In the case of this determination in S21 being YES, since the lid has been appropriately closed by the user, the possibility of a dead battery is low, it is determined that there is little necessity to prohibit activation of the communication system thereafter, the time-out flag is reset to OFF (S22), and this processing is ended.

In the case of the determination in S21 being NO, the processing advances to S23, and it is determined whether the ignition switch has been turned ON. In the case of this determination in S23 being YES, since a state is entered in which the battery can be charged on the vehicle by the electric power generation starting in the fuel cell, the possibility of a dead battery is low, it is determined that there is little necessity to prohibit activation of the communication system thereafter, the time-out flag is reset to OFF (S22), and this processing is ended. It should be noted that, in a case of this reset processing of the time-out flag in FIG. 3 being executed, a case of a user leaving the hydrogen filler nozzle connected to the hydrogen feed port is assumed. Therefore, in this case, in response to the ignition switch having been turned ON, electric power generation by the fuel cell is permitted; however, since the vehicle is prevented from starting to run while the hydrogen filler nozzle is connected, travel of the vehicle is not permitted. In the case of the determination in S23 being NO, the processing advances to S21 again, and it is determined whether the lid has been closed.

Figure 4:
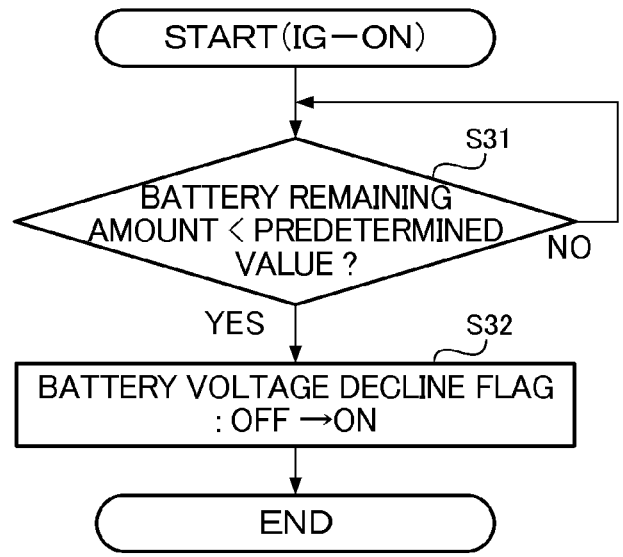
FIG. 4 is a flowchart showing the sequence of update processing of a battery voltage decline flag.

FIG. 4 is a flowchart showing the sequence of updating the battery voltage decline flag from OFF to ON. The update processing of this battery voltage decline flag is executed in the communicative filling ECU after the ignition switch has been turned OFF.

In S31, the remaining amount of the battery (SOC) is calculated based on the output of the battery voltage sensor, and it is determined whether this battery remaining amount is smaller than a predetermined value. In the case of this determination in S31 being YES, it is determined that the possibility of a dead battery is high, the battery voltage decline flag is set from OFF to ON (S32) in order to prohibit activation of the communication system thereafter, and this processing is ended.

It should be noted that the battery voltage decline flag is reset again to OFF after having become ON in S32, in response to the ignition switch subsequently having been turned ON. As mentioned above, this is because, when the ignition switch has been turned ON and electric power generation by the fuel cell becomes possible, due to entering a state in which the battery can be charged, the possibility of a dead battery is low, and it is considered that there is little necessity to prohibit activation of the communication system thereafter.

It should be noted that, upon calculating the remaining amount of the battery based on the output value of the battery voltage sensor in the above S31, the possibility of a dead battery is determined by comparing this with a predetermined value; however, it is not limited thereto. In other words, since the voltage of the battery gradually declines accompanying electrical discharge, the possibility of a dead battery may be determined by comparing the detection value of the voltage sensor with a predetermined value.

Figure 5:
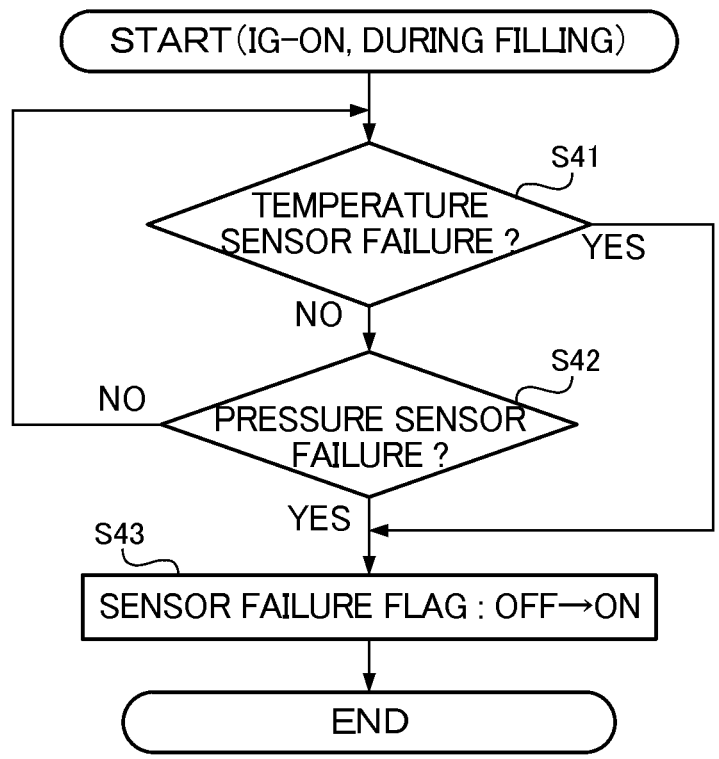
FIG. 5 is a flowchart showing the sequence of update processing of a sensor failure flag.

FIG. 5 is a flowchart showing the sequence of updating the sensor failure flag from OFF to ON. The update processing of this sensor failure flag is performed by the communicative filling ECU while the ignition switch is ON and during filling of hydrogen (during activation of the communication system, refer to S6 to S9 in FIG. 2).

In S41, it is determined whether the temperature sensor has failed, and in S42, it is determined whether the pressure sensor has failed. Herein, a previously known method is used in the determinations of failure of the temperature sensor and pressure sensor. More specifically, in a case of providing two of both the temperature sensor and pressure sensor in advance, and there being a great difference in the detection value of each, for example, it can be determined that either has failed. In addition, in a case of using a temperature sensor and pressure sensor to which an automatic diagnoses function is built-in, failure can be determined using this function.

In the case of either of these determinations in S41 and S42 being YES, i.e. in the case of failure of at least either of the temperature sensor and pressure sensor having been detected, the processing advances to S43, the sensor failure flag is set from OFF to ON in order to prohibit activation of the communication system thereafter, and this processing is ended.

It should be noted that this sensor failure flag is reset to OFF again, similarly to the aforementioned battery voltage decline flag, after having become ON in S43, in response to the ignition switch subsequently having been turned ON. This is in order to prevent failure determination of the sensor from continuing to remain active irrespective of the sensor not failing, since there may be a case in which failure of the sensor is resolved by repair or the like while the ignition switch is OFF.

The following effects are exerted according to the fuel cell vehicle 2 of the above described present embodiment.

a. In the present embodiment, by determining whether being a state in which activation of the communication system 5 is not permitted in the case of the lid 23 having been opened, it is possible to perform communicative filling only in a case of the reliability of a data signal transmitted from the infrared transmitter or transmitting means is adequately guaranteed.

b. In the present embodiment, by indirectly determining whether being a state in which activation of the communication system 5 is permitted every time in a case of the lid 23 having been opened, based on the state of the activation prohibited flag at this time, without directly determining using various sensors, it is possible to instantly determine the feasibility of activation of the communication system 5 after the lid 23 has been opened.

c. In the present embodiment, in a case of the elapsed time since the lid 23 was opened exceeding a predetermined time, it is assumed that the lid 23 has been forgotten to be closed, and the time-out flag is turned ON in order to prohibit subsequent activation of the communication system 5. It is thereby possible to perform communicative filling only in a case in which the reliability of data signals transmitted from the communication system 5 is adequately guaranteed. In addition, it is possible to prevent an excessive decline in the remaining amount of the communication electric power supply device, even in a case of filling fuel gas over a prolonged time from an electrolysis device or the like.

d. In the present embodiment, the battery voltage decline flag is turned ON in order to prohibit a next activation of the communication system 5, in a case of the remaining amount of the battery 52 having become no more than a predetermined value. It is thereby possible to perform communicative filling only in a case in which the reliability of data signals transmitted from the communication system 5 is adequately guaranteed.

e. In the present embodiment, since the lid has been appropriately closed by the user in a case of the closed state of the lid 23 is detected, it is assumed that there is no excessive decline in the remaining amount of the battery 52 during the next activation of the communication system 5, and the time-out flag is turned OFF. It is thereby possible to prevent activation of the communication system 5 from being excessively prohibited.

f. In the present embodiment, it is assumed that there is no excessive decline in the remaining amount of the battery 52 during the next activation of the communication system 5 in a case of the fuel cell system 3 having been activated, and thus the time-out flag and battery voltage decline flag are turned OFF. It is thereby possible to prevent the activation of the communication system 5 from being excessively prohibited.

g. According to the present embodiment, it is determined that the reliability of the data signal itself transmitted from the communication system 5 is not adequate in a case of failure of at least one among the pressure sensor 36 and the temperature sensor 37 having been detected, and then the sensor failure flag is turned ON. It is thereby possible to perform communicative filling only in a case of the reliability of the data signals transmitted from the communication system 5 being adequately guaranteed.

Although an embodiment of the present invention has been explained above, the present invention is not to be limited thereto.

In the above embodiment, in a case of the sensor failure flag being ON during activation of the communication system 5, the user is notified of being in a state in which the sensor 36 or 37 has failed, and of being a state in which activation of the communication system 5 is not permitted due to the failure of the sensor 36 or 37, by way of illuminating a warning light provided to the instrument panel; however, the means for notification is not limited thereto, and it may be notified by causing lights of the vehicle to flash, for example.

An example in which the storage vessel storing fuel gas is a high-pressure tank has been explained in the above-mentioned embodiment; however, it is not limited thereto, and a hydrogen tank equipped with a storage alloy may be the storage vessel.

In addition, an example of a fuel cell vehicle with hydrogen as the fuel gas has been explained in the above-mentioned embodiment; however, it is not limited thereto, and can also be applied to a natural gas vehicle in which natural gas is established as the fuel gas.

Furthermore, an example in which a fuel cell vehicle is established as the moving body has been explained in the above-mentioned embodiment; however, it is not limited thereto, and it can also be applied to moving bodies such as motorbikes, ships, spacecraft and robots.

In addition, the present invention is applicable so long as being a moving body provided with configurations corresponding to the lidded box 21, which is referred to in the fuel cell vehicle 2 of the above-mentioned embodiment, and the hydrogen feed port 22 that is protected inside thereof. For example, an electric vehicle includes an electricity storage device that stores electric power, a state detection means (e.g., the voltage sensor, current sensor, temperature sensor, etc. of the electricity storage device) for detecting a parameter correlated to the state of the electricity storage device (e.g., the remaining amount of the electricity storage device), a transmitting means for transmitting a data signal generated based on the parameter thus detected to an external electric power supply device (e.g., charging equipment for the electricity storage device), a lidded box that protects inside thereof an electrical supply port for supplying electric power to the electricity storage device, and a lid switch that detects the opened state of the lid of the lidded box. With this electric vehicle, when compared with the fuel cell vehicle 2 of the above-mentioned embodiment, the electricity storage device corresponds to the high-pressure tank 32, the state detection means corresponds to the pressure sensor 36 and temperature sensor 37, the electric power supply device corresponds to the hydrogen gas station 1, and the electrical supply port corresponds to the hydrogen feed port 22. Furthermore, the processing related to activation/stop of the communication system 5 of the fuel cell vehicle 2 shown in FIGS. 2 to 5 can all be replaced in the aforementioned such electric vehicle, by replacing the hydrogen remaining amount inside of the high-pressure tank 32, which is referenced in the fuel cell vehicle 2 of the above-mentioned embodiment, with the electric power remaining amount of the electricity storage device.

What is claimed is:

1. A moving body comprising:
a storage vessel that stores fuel gas;
a pressure detection means for detecting a pressure inside of the storage vessel;
a temperature detection means for detecting a temperature of the storage vessel;
a transmitting means for transmitting a data signal generated based on the pressure and the temperature thus detected to an external fuel gas supply device;
a communication electric power supply device that supplies electric power to the transmitting means;
a lidded box that protects inside thereof a gas feed port for filling fuel gas into the storage vessel;
a lid opened-state detection means for detecting an opened state of a lid of the lidded box; and
a control device that activates the transmitting means after the lid has been opened, and performs communication between the transmitting means and the fuel gas supply device,
wherein the control device includes an activation determination means for determining either (1) being a state in which activation of the transmitting means is not permitted, or (2) being a state in which activation of the transmitting means is permitted, the control device activates the transmitting means in a case of the activation determination means having determined being a state in which activation is permitted, and the control device determines being a state in which activation is not permitted in response a failure that causes the transmitting means to not be able to transmit data that is adequately reliable.

2. The moving body according to claim 1,
wherein the control device further includes a flag setting means for setting from OFF to ON an activation prohibited flag indicating being in a state in which activation of the transmitting means is not permitted, in response to a predetermined prohibited condition being established, and
wherein the activation determination means determines being a state in which activation of the transmitting means is not permitted in a case of the activation prohibited flag being ON, and determines being a state in which activation of the transmitting means is permitted in a case of the activation prohibited flag being OFF.

3. The moving body according to claim 2, wherein the control device further includes a timing means for measuring an elapsed time since the opened-state of the lid was detected, and
wherein the prohibited condition includes the time measured by the timing means having exceeded a predetermined time.

4. The moving body according to claim 2,
wherein the control device further includes a remaining amount detection means for detecting a remaining amount of the communication electric power supply device, and
wherein the prohibited condition includes the remaining amount detected by the remaining amount detection means having become no more than a predetermined value.

5. The moving body according to claim 2, further comprising a lid closed-state detection means for detecting a closed-state of the lid,
wherein the flag setting means sets the activation prohibited flag from ON to OFF in a case of the lid closed-state detection means having detected the closed-state of the lid, while the activation prohibited flag is ON.

6. The moving body according to claim 2,
wherein the moving body is a fuel cell vehicle that includes a fuel cell system that generates electricity using fuel gas inside of the storage vessel, and an activation request detection means for detecting an activation request for the fuel cell system, and
wherein the flag setting means sets the activation prohibited flag from ON to OFF in a case of the activation request detection means having detected an activation request for the fuel cell system, while the activation prohibited flag is ON.

7. The moving body according to claim 2,
wherein the control device further includes a first failure detection means for detecting failure of the pressure detection means, and a second failure detection means for detecting failure of the temperature detection means, and
wherein the prohibited condition includes at least one among the first failure detection means and the second failure detection means having detected failure.

8. The moving body according to claim 3,
wherein the control device further includes a remaining amount detection means for detecting a remaining amount of the communication electric power supply device, and
wherein the prohibited condition includes the remaining amount detected by the remaining amount detection means having become no more than a predetermined value.

9. The moving body according to claim 3, further comprising a lid closed-state detection means for detecting a closed-state of the lid,
wherein the flag setting means sets the activation prohibited flag from ON to OFF in a case of the lid closed-state detection means having detected the closed-state of the lid, while the activation prohibited flag is ON.

10. The moving body according to claim 3,
wherein the moving body is a fuel cell vehicle that includes a fuel cell system that generates electricity using fuel gas inside of the storage vessel, and an activation request detection means for detecting an activation request for the fuel cell system, and
wherein the flag setting means sets the activation prohibited flag from ON to OFF in a case of the activation request detection means having detected an activation request for the fuel cell system, while the activation prohibited flag is ON.

11. The moving body according to claim 3,
wherein the control device further includes a first failure detection means for detecting failure of the pressure detection means, and a second failure detection means for detecting failure of the temperature detection means, and
wherein the prohibited condition includes at least one among the first failure detection means and the second failure detection means having detected failure.

12. The moving body according to claim 4, further comprising a lid closed-state detection means for detecting a closed-state of the lid,
wherein the flag setting means sets the activation prohibited flag from ON to OFF in a case of the lid closed-state detection means having detected the closed-state of the lid, while the activation prohibited flag is ON.

13. The moving body according to claim 4,
wherein the moving body is a fuel cell vehicle that includes a fuel cell system that generates electricity using fuel gas inside of the storage vessel, and an activation request detection means for detecting an activation request for the fuel cell system, and
wherein the flag setting means sets the activation prohibited flag from ON to OFF in a case of the activation request detection means having detected an activation request for the fuel cell system, while the activation prohibited flag is ON.

14. The moving body according to claim 4,
wherein the control device further includes a first failure detection means for detecting failure of the pressure detection means, and a second failure detection means for detecting failure of the temperature detection means, and
wherein the prohibited condition includes at least one among the first failure detection means and the second failure detection means having detected failure.

15. A moving body comprising:
an electricity storage device that stores electric power;
a state detection means for detecting a parameter correlated to a state of the electricity storage device;
a transmitting means for transmitting a data signal generated based on the parameter thus detected to an external electric power supply device;
a communication electric power supply device that supplies electric power to the transmitting means;
a lidded box that protects inside thereof an electrical supply port for supplying electric power to the electricity storage device;
a lid opened-state detection means for detecting an opened state of a lid of the lidded box; and
a control device that activates the transmitting means after the lid has been opened, and performs communication between the transmitting means and the electric power supply device,
wherein the control device includes an activation determination means for determining either (1) being a state in which activation of the transmitting means is not permitted, or (2) being a state in which activation of the transmitting means is permitted, and the control device activates the transmitting means in a case of the activation determination means having determined being a state in which activation is permitted, and the control device determines being a state in which activation is not permitted in response to a failure that causes transmitting means to not be able to transmit data that is adequately reliable.

16. The moving body according to claim 15,
wherein the control device further includes a flag setting means for setting from OFF to ON an activation prohibited flag indicating being in a state in which activation of the transmitting means is not permitted, in response to a predetermined prohibited condition being established, and
wherein the activation determination means determines being a state in which activation of the transmitting means is not permitted in a case of the activation prohibited flag being ON, and determines being a state in which activation of the transmitting means is permitted in a case of the activation prohibited flag being OFF.

17. The moving body according to claim 16, wherein the control device further includes: a timing means for measuring an elapsed time since the opened-state of the lid was detected; a remaining amount detection means for detecting a remaining amount of the communication electric power supply device; and a lid closed-state detection means for detecting a closed-state of the lid, wherein the prohibited condition includes the time measured by the timing means having exceeded a predetermined time, and the remaining amount detected by the remaining amount detection means having become no more than a predetermined value, and wherein the flag setting means sets the activation prohibited flag from ON to OFF in a case of the lid closed-state detection means having detected the closed-state of the lid, while the activation prohibited flag is ON.

18. The moving body according to claim 16, wherein the moving body is a hybrid vehicle that includes an internal combustion engine, a power generator that generates electricity using motive force generated by the internal combustion engine, and an activation request detection means for detecting an activation request for the internal combustion engine, and wherein the flag setting means sets the activation prohibited flag from ON to OFF in a case of the activation request detection means having detected an activation request for the internal combustion engine while the activation prohibited flag is ON.

19. The moving body according to claim 18, wherein the moving body is a hybrid vehicle that includes an internal combustion engine, a power generator that generates electricity using motive force generated by the internal combustion engine, and an activation request detection means for detecting an activation request for the internal combustion engine, and wherein the flag setting means sets the activation prohibited flag from ON to OFF in a case of the activation request detection means having detected an activation request for the internal combustion engine while the activation prohibited flag is ON.

20. The moving body according to claim 1, wherein the control device determines being a state in which activation of the transmitting means is not permitted in response to the lid having been detected to be in an opened-state.

21. The moving body according to claim 15, wherein the control device determines being a state in which activation of the transmitting means is not permitted in response to the lid having been detected to be in an opened-state.

* * * * *